United States Patent
Yamamoto et al.

(10) Patent No.: US 10,871,117 B2
(45) Date of Patent: Dec. 22, 2020

(54) SENSOR CONTROL APPARATUS

(71) Applicant: DENSO CORPORATION, Kariya (JP)

(72) Inventors: Masahiro Yamamoto, Kariya (JP);
Masayuki Tamura, Kariya (JP);
Takashi Araki, Kariya (JP); Go Miyagawa, Kariya (JP); Manabu Yoshidome, Kariya (JP); Masato Katsuno, Kariya (JP); Toshihiro Sakawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 184 days.

(21) Appl. No.: 16/070,894

(22) PCT Filed: Jan. 18, 2017

(86) PCT No.: PCT/JP2017/001452
§ 371 (c)(1),
(2) Date: Jul. 18, 2018

(87) PCT Pub. No.: WO2017/126516
PCT Pub. Date: Jul. 27, 2017

(65) Prior Publication Data
US 2019/0032588 A1 Jan. 31, 2019

(30) Foreign Application Priority Data
Jan. 19, 2016 (JP) .................... 2016-007835

(51) Int. Cl.
*F02D 41/14* (2006.01)
*F01N 3/02* (2006.01)
(Continued)

(52) U.S. Cl.
CPC .......... *F02D 41/1466* (2013.01); *F01N 3/02* (2013.01); *F02D 41/1494* (2013.01);
(Continued)

(58) Field of Classification Search
CPC ............ F02D 41/1466; F02D 41/1494; F02D 220/604; F01N 3/02; F01N 2900/0422;
(Continued)

(56) References Cited

U.S. PATENT DOCUMENTS

| 2011/0320171 A1 | 12/2011 | Okayama et al. |
| 2012/0144813 A1 | 6/2012 | Yahata et al. |

(Continued)

FOREIGN PATENT DOCUMENTS

JP 2012-149525 8/2012

*Primary Examiner* — Robert R Raevis
(74) *Attorney, Agent, or Firm* — Nixon & Vanderhye, P.C.

(57) ABSTRACT

After an engine is started, an ECU performs first regeneration processing of a PM sensor through heating by a heater and, after the first regeneration processing, applies a voltage continuously to detection electrodes for a predetermined voltage application period. The ECU causes PM to adhere to an insulating substrate due to the voltage application and, at a time point after the predetermined time period has elapsed, determines the amount of PM that is adhering to the insulating substrate. When a predetermined condition is satisfied outside the voltage application period, the ECU determines whether the amount of adhering PM on the insulating substrate is equal to or greater than an excess determination threshold value. If the amount of adhering PM is determined to be equal to or greater than the excess determination threshold value, the ECU performs second regeneration processing of the PM sensor, through heating by the heater.

9 Claims, 4 Drawing Sheets

(51) Int. Cl.
*G01N 15/06* (2006.01)
*F01N 11/00* (2006.01)

(52) U.S. Cl.
CPC .......... *G01N 15/0656* (2013.01); *F01N 11/00* (2013.01); *F01N 2240/16* (2013.01); *F01N 2560/05* (2013.01); *F01N 2560/20* (2013.01); *F01N 2900/0422* (2013.01)

(58) Field of Classification Search
CPC .. F01N 2240/16; F01N 11/00; F01N 2560/05; F01N 2560/20; F01N 3/021; G01N 15/0656
USPC ..... 73/23.31, 114.69, 114.71, 114.77, 865.9; 340/627, 628, 438, 607
See application file for complete search history.

(56) References Cited

U.S. PATENT DOCUMENTS

| | | |
|---|---|---|
| 2012/0233987 A1 | 9/2012 | Aoki et al. |
| 2014/0165979 A1 | 6/2014 | Nishijima et al. |

SENSOR CONTROL APPARATUS

This application is the U.S. national phase of International Application No. PCT/JP2017/001452 filed 18 Jan. 2017, which designated the U.S. and claims priority to JP Patent Application No. 2016-007835 filed 19 Jan. 2016, the entire contents of each of which are hereby incorporated by reference.

TECHNICAL FIELD

The present disclosure relates to technology for controlling a sensor which detects particulate matter (PM) in the exhaust passage of an internal combustion engine.

BACKGROUND ART

Technology is known in the conventional art for restraining the emission to the atmosphere of particulate matter that is discharged from an engine. A filter apparatus for collecting the particulate matter is disposed in the exhaust passage from the engine. A particulate matter sensor (PM sensor) is provided downstream from the filter apparatus, for determining whether there is an abnormality such as cracking or melting damage or the like of the filter apparatus.

With the patent of PTL 1, the following technology is disclosed for accurately detecting the amount of particulate matter that reaches the sensor. Specifically, a first regeneration processing is executed, for burning to remove residual particulate matter on the PM sensor. Next, a voltage is applied continuously between counter electrodes, for thereby establishing a condition in which the particulate matter can readily adhere to an adherence portion (electrostatic collection portion). A determination is then made, at a time point after a predetermined time period has elapsed, as to the amount of particulate matter that is adhering.

CITATION LIST

Patent Literature

[PTL 1] JP 5115873 B

SUMMARY OF THE INVENTION

Technical Problem

With a configuration in which the time for which a voltage applied to the counter electrodes is limited to a predetermined time period, it is conceivable that particulate matter contained in the exhaust gas may adhere to the adherence portion at times outside the predetermined time period. If such a condition is left unchanged, there is a danger that the adherence portion may reach a state of excessive adherence of the particulate matter. Hence, even if the first regeneration processing has been performed for burning to remove particulate matter after the engine was started, there is a danger that particulate matter will remain on the adherence portion, and that as a result, there will be a lowering of the accuracy of determining the amount of particulate matter adhering to the adherence portion.

The present disclosure provides a sensor control technology that can restrain an excessive amount of particulate matter from remaining on the adherence portion after the first regeneration processing has been performed, and can enable the amount of particulate matter adhering to the adherence portion to be appropriately determined.

Solution of Problem

A sensor control apparatus that is one form of the technology of the present disclosure is described in the following.

The sensor control apparatus (20) of the present disclosure is applied to a sensor (15), with the sensor having an adherence portion (32) to which electrically conductive particulate matter contained in exhaust gas adheres, a pair of counter electrodes (36a and 36b) that are provided spaced apart from one another and disposed at the adherence portion, and a heater (35) for heating the adherence portion, the sensor being disposed in an exhaust gas passage (13) of an internal combustion engine (11) and outputting a detection signal in accordance with the amount of the adhering particulate matter, and with the sensor control apparatus detecting the amount of the adhering particulate matter based on the detection signal; the sensor control apparatus being equipped with a first regeneration section which, after the internal combustion engine is started, performs first regeneration processing of the sensor through heating by the heater, a first determination section which causes the particulate matter to adhere to the adherence portion by a condition in which a voltage is continuously applied to the pair of counter electrodes for a predetermined time period after the first regeneration processing has been performed and which determines the amount of adhering particulate matter on the adherence portion at a time point after the predetermined time period has elapsed, a second determination section which, when a predetermined condition is satisfied outside the predetermined time period, determines whether or not the amount of adhering particulate matter on the adherence portion is equal to or greater than a predetermined value, and a second regeneration section, which performs second regeneration processing of the sensor through heating by the heater, when it is determined by the second determination section that the amount of adhering particulate matter on the adherence portion is equal to or greater than the predetermined value.

With a sensor control apparatus, following the first regeneration processing, particulate matter is caused to adhere to an adherence portion by a condition in which a voltage is continuously applied to counter electrodes during a predetermined time period that is of limited duration. With such a sensor control apparatus, it has been found that particulate matter contained in the exhaust gas will adhere to the adherence portion at times that outside the predetermined time period. As a result, if the sensor control apparatus is left in such a condition, a state of excessive adherence of particulate matter to the adherence portion will arise. Hence even if the first regeneration processing is performed after the internal combustion engine is started, there is a danger that particulate matter will remain on the adherence portion, and that there will be a resultant lowering of accuracy in determining the amount of particulate matter that is adhering to the adherence portion.

In contrast, with a sensor control apparatus according to the present disclosure, if a predetermined condition is satisfied at times outside the predetermined time period, a decision is made as to whether the amount of particulate matter adhering to the adherence portion is equal to or greater than a predetermined value. If it is determined as a result that the amount of particulate matter adhering to the adherence portion is equal to or greater than the predetermined value, then second regeneration processing is performed by heating of the heater. As a result with the sensor control apparatus of the present disclosure, even if particulate matter adheres to the adherence portion at times other than during the predetermined time period in which a voltage is applied to the counter electrodes, a state of excessive adherence of particulate matter will not be left unchanged. Hence with the sensor control apparatus of the present disclosure, excessive adherence of particulate matter after the first regeneration processing can be restrained, and the amount of particulate matter adhering to the adherence portion can be appropriately determined.

DESCRIPTION OF EMBODIMENTS

A present embodiment is an example of an exhaust gas processing system for a vehicle that is equipped with an engine. The exhaust gas processing system is equipped with a particulate matter filter (referred to in the following as a PM filter) as a filter apparatus, that is disposed in the exhaust pipe of the engine, and a PM sensor that is disposed at the downstream side of the PM filter. This exhaust gas processing system monitors the PM filter for abnormality, based on the amount of adhering PM that is detected by the particulate matter sensor (referred to in the following as a PM sensor).

Figure 1:
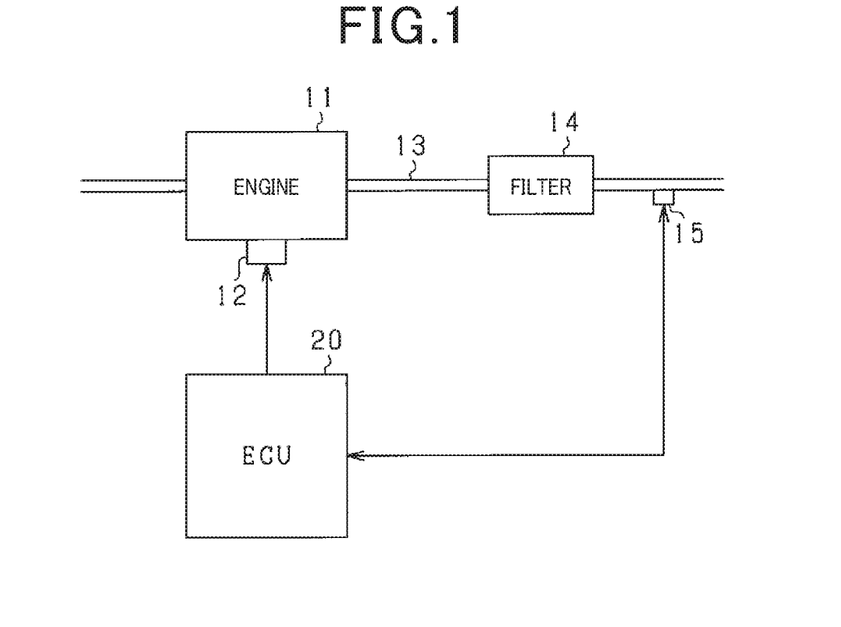
FIG. 1 is a diagram of the general configuration of an exhaust gas processing system.

FIG. 1 is a configuration diagram showing the general configuration of this system. The engine 11 is a diesel engine. The engine 11 is equipped with fuel injectors 12, as actuators concerned with operating the engine 11. A PM filter 14 is provided in the exhaust pipe 13 of the engine 11. A PM sensor 15 is provided downstream from the PM filter 14.

An ECU 20 is equipped with a microcomputer that includes a CPU, ROM, RAM, etc. The ECU 20 executes a control program that is stored in the ROM, to perform various types of control of the engine 11 in accordance with the running condition. Specifically, the ECU 20 receives detection signals that are inputted from sensors, etc., and based on the inputted detection signals, the ECU 20 calculates injection timings and injection amounts of fuel, and controls driving of the fuel injectors 12. With the present embodiment, the ECU 20 corresponds to a sensor control apparatus.

Figure 2:
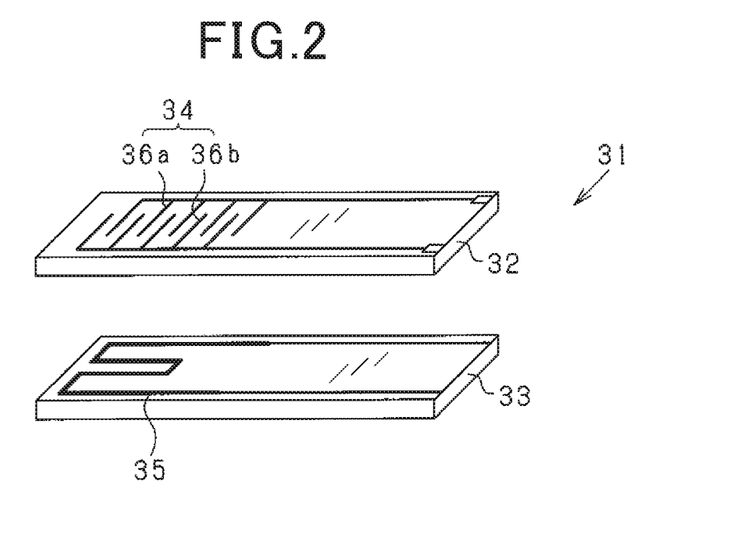
FIG. 2 is an oblique view showing the overall configuration of a sensor element of a particulate matter sensor.
Figure 3:
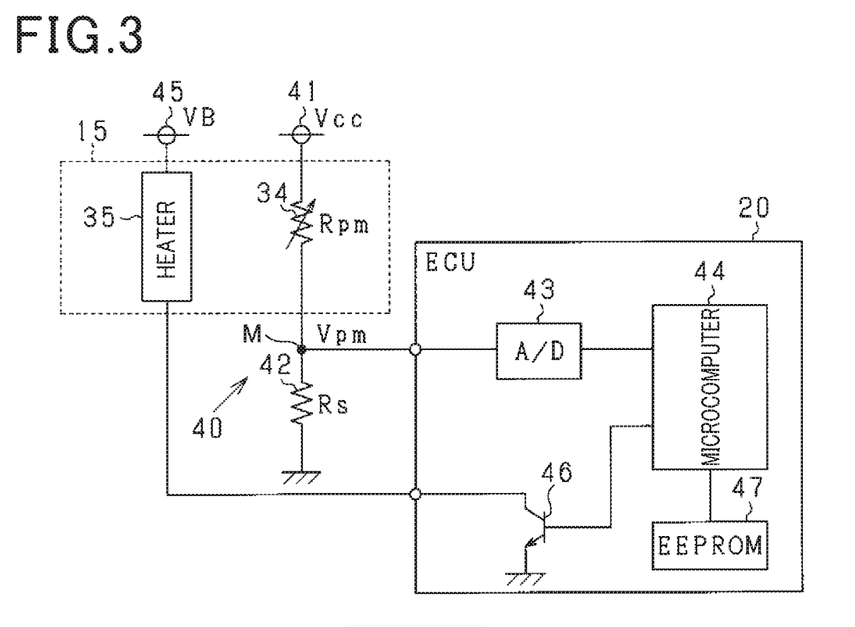
FIG. 3 is an electrical configuration diagram relating to a particulate matter sensor.

Next, the construction of the PM sensor 15, and the electrical configuration relating to the PM sensor 15 will be described referring to FIGS. 2 and 3. FIG. 2 is an oblique exploded view showing the general configuration of the sensor element 31 that constitutes the PM sensor 15. FIG. 3 is an electrical configuration diagram relating to the PM sensor 15.

As shown in FIG. 2, the sensor element 31 has two insulating substrates 32 and 33, that are of flat elongated form. The insulating substrate 32 is provided with a PM detector (PM detection section) 34 for detecting the amount of adhering PM. With the present embodiment the insulating substrate 32 corresponds to an "adherence portion", to which the electrically conductive particulate matter contained in the exhaust gas is caused to adhere. The insulating substrate 33 is provided with a heater (heating section) 35 for heating the sensor element 31. The sensor element 31 is configured by stacking the insulating substrates 32 and 33 as two layers.

The insulating substrate 32 is provided with detection electrodes 36a and 36b, spaced apart from one another, on a substrate face that is at the opposite side from the face which is stacked against the insulating substrate 33. A PM detector 34 is made up of that pair of detection electrodes 36a and 36b. The detection electrodes 36a and 36b are each of comb-shaped form, having a plurality of comb teeth. The detection electrodes 36a and 36b are disposed mutually opposing and spaced apart, such that adjacent comb teeth are mutually different. With the present embodiment the detection electrodes 36a and 36b correspond to a "pair of counter electrodes". The heater 35 is configured from a heat-generating body such as an electric heating wire or the like.

The form of the pair of detection electrodes 36a and 36b is not necessarily limited to the above shape. It would be equally possible to for the detection electrodes 36a and 36b to be formed with a curved shape. Furthermore it would be equally possible for the detection electrodes 36a and 36b to be formed of a pair of electrode portions consisting of respective single wires, which are disposed opposing and parallel, spaced apart by a predetermined distance.

The PM sensor 15 has a retaining portion (not shown in the drawings) for retaining the sensor element 31. The sensor element 31 is fixed on the exhaust pipe 13 in a condition of being attached by the retaining portion at one end. Specifically, the PM sensor 15 is fixed on the exhaust pipe 13 in the following manner. In the PM sensor 15, a part of the sensor element 31 that includes at least the PM detector 34 and the heater 35 is provided such as to be in the interior of the exhaust pipe 13. Furthermore the PM sensor 15 is disposed such that the insulating substrate 32 (the PM adherence portion) faces upstream with respect to the flow of exhaust gas. In that way, after exhaust gas that contains PM flows in the interior of the exhaust pipe 13, PM adheres to the detection electrodes 36a and 36b of the insulating substrate 32 of the PM sensor 15 and the surroundings thereof. Furthermore, the PM sensor 15 has a protective cover which covers the protruding portion of the sensor element 31.

The PM sensor 15 detects the amount of adhering PM in the following way. If PM in the exhaust gas adheres to the insulating substrate 32 of the sensor element 31, then the resistance value of the PM detector 34 (the resistance value between the detection electrodes 36a and 36b) will change. The change of the resistance value corresponds to the amount of adhering PM. For that reason, the PM sensor 15 uses changes in resistance of the PM detector 34 for detecting the amount of adhering PM.

As shown in FIG. 3, a sensor power source 41 is connected to one end of the PM detector 34 of the PM sensor 15. On the other hand a shunt resistor 42 is connected to the other end of the PM detector 34. The sensor power source 41 is configured of a voltage stabilizer circuit etc., and the stabilized voltage Vcc is 5 V. With such a configuration, a voltage divider circuit 40 is formed by the PM detector 34 and the shunt resistor 42, and the voltage at the center point of the voltage divider circuit 40 is inputted to the ECU 20 as the PM detected voltage Vpm (sensor output value). Specifically, with the PM detector 34, the resistance value Rpm changes in accordance with the amount of adhering PM. The PM detected voltage Vpm is changed by the resistance value Rpm of the PM detector 34 and the resistance value Rs of the shunt resistor 42. The PM detected voltage Vpm is inputted to the microcomputer 44 via an A/D converter 43. The microcomputer 44 calculates the amount of adhering PM in accordance with the PM detected voltage Vpm. Furthermore the microcomputer 44 switches the sensor power source 41 between an on condition and an off condition. The microcomputer 44 thereby controls switching between a state of applying voltage and a state of not applying voltage to the pair of detection electrodes 36a and 36b. With such a configuration, when a voltage is applied to the pair of detection electrodes 36a and 36b, PM is electrostatically led to the PM detector 34 and is collected on the insulating substrate 32 (electrostatic collection). The PM detected voltage Vpm is then detected in accordance with the amount of adhering PM.

A heater power source 45 is connected to the heater 35 of the PM sensor 15. The heater power source 45 is a vehicle-installed battery or the like. The heater 35 is heated by electric power supplied from the heater power source 45. A transistor 46 is connected to the low-potential side of the heater 35 as a switching element. With such a configuration, heating of the heater 35 is controlled by on/off switching of the transistor 46 by the microcomputer 44.

If energization of the heater 35 is started in a condition in which there is PM adhering to the insulating substrate 32 of the sensor element 31, the temperature of the adhering PM rises, and the PM is forcibly burned. With this sensor control apparatus, PM adhering to the insulating substrate 32 of the sensor element 31 is burned off by means of this forcible burning. The microcomputer 44 executes control of heating by the heater 35 by issuing a forcible PM burning request, for example after the engine 11 is started or after running is ended. The forcible PM burning processing of the PM sensor 15 is performed for regenerating the function of detecting the amount of adhering PM. Hence the forcible burning processing of the PM sensor 15 is called sensor regeneration processing.

The ECU 20 is furthermore provided with an EEPROM (registered trade mark) 47, as a backup memory for storing learning values, failure diagnosis values, etc.

The ECU 20 executes abnormality determination processing of the PM filter 14 based on the amount of adhering PM. Specifically, the ECU 20 performs sensitivity regeneration processing (first regeneration processing) after the engine 11 has started. The ECU 20 executes control of applying a voltage continuously to the detection electrodes 36a and 36b until a predetermined time period (predetermined voltage application period) has elapsed after the sensor regeneration processing has been completed. As a result, with this sensor control apparatus, the PM which passes through the PM filter 14 is caused to adhere to the insulating substrate 32 of the sensor element 31 (electrostatic collection), in a condition in which a voltage is being continuously applied to the detection electrodes 36a and 36b. The ECU 20 then, in a first determination that is performed after a predetermined time period has elapsed, determines whether or not the amount of adhering PM on the insulating substrate 32 is equal to or greater than an abnormality determination threshold value Th1 (first determination; adhering PM amount determination processing). If it is determined in the first determination that the amount of adhering PM is equal to or greater than the abnormality determination threshold value Th1, then the ECU 20 notifies the user, by turning on an abnormality warning lamp, etc., that an abnormality such as splitting or melting damage to the PM filter 14 has occurred. Depending on the circumstances, limited running of engine 11 or the like may be performed by fail safe processing. The abnormality determination threshold value Th1 is predetermined as a value for determining whether or not the amount of PM arriving at the sensor element 31 is appropriate.

With a sensor control apparatus, for executing the first determination, a voltage is continuously applied to the detection electrodes 36a and 36b during a time that is limited to a predetermined time period (predetermined voltage application period) following the first regeneration processing. The sensor control apparatus thus causes PM to adhere to the insulating substrate 32 of the sensor element 31 in a condition in which a voltage is being continuously applied to the detection electrodes 36a and 36b (electrostatic collection). However it has been found that PM will adhere to the insulating substrate 32 of the sensor control apparatus at times that are outside the predetermined voltage application period. In such a case, it can be considered that the amount of adhering PM will, in particular, increase after the predetermined time period has elapsed. That is to say, by comparison with PM adherence in the case in which electrostatic collection is not performed, it can be considered that there may be a condition in which there is a large amount of adhering PM when the PM is caused to adhere by electrostatic collection. It can be considered that in such a condition, an excessive PM adherence state can readily arise. Thus with that sensor control apparatus, even if the first regeneration processing is executed after the engine 11 is started, PM will remain adhering to the insulating substrate 32, and as a result there is a danger that the accuracy of determining the amount of adhering PM will be lowered.

However with the sensor control apparatus of the present embodiment, to suppress adherence of an excessive amount of PM, the ECU 20 performs the following control after the abnormality determination processing that ends the first determination. Specifically, after a predetermined time period (predetermined voltage application period) has elapsed, if a predetermined condition is satisfied, the ECU 20 determines whether or not the amount of adhering PM is equal to or greater than an excessive PM adherence determination threshold value Th2 (second determination; excessive PM adherence determination processing). If the ECU 20 determines in the second determination that the amount of adhering PM is equal to or greater than the excessive PM adherence determination threshold value Th2, then sensor regeneration processing (second regeneration processing) is performed by heating of the heater 35. It should be noted that the excessive PM adherence determination threshold value Th2 is predetermined as a value at which burning removal can be achieved by means of the sensor regeneration processing (second regeneration processing). At that time, the excessive PM adherence determination threshold value Th2 is preferably made smaller than the abnormality determination threshold value Th1 (Th2<Th1).

Figure 4:
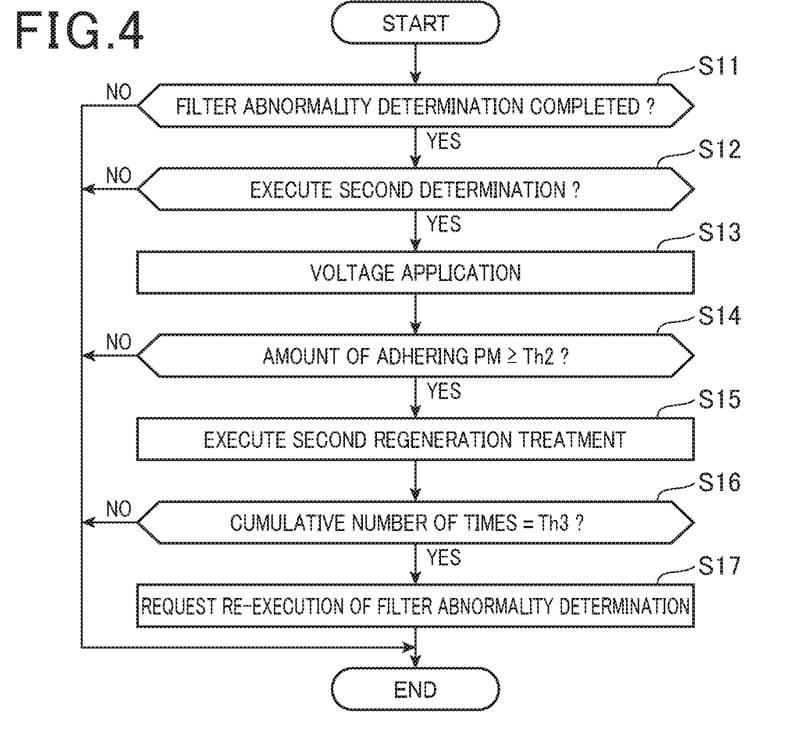
FIG. 4 is a flow diagram of a second regeneration processing sequence.

Next, the second regeneration processing that is executed by the ECU 20 will be described referring to FIG. 4. This processing is repetitively performed by the ECU 20, with a predetermined cycle.

The ECU 20 determines whether or not the abnormality determination processing of the PM filter 14 has been completed, and determines whether or not it has been determined that the PM filter 14 is functioning normally (step S11). With the present embodiment, if it has been determined that the PM filter 14 is functioning normally, then a flag is set (normal) to indicate this. Hence when this flag is set, the ECU 20 determines that the abnormality determination processing of the PM filter 14 has been completed, and that the PM filter 14 is functioning normally (YES decision). On the other hand if the flag is not set, the ECU 20 determines that the abnormality determination processing of the PM filter 14 has not been completed, or that the PM filter 14 is not functioning normally (NO decision).

If the ECU 20 makes a positive decision (YES) in the determination processing of step S11, then the processing advances to step S12. On the other hand if the ECU 20 makes a negative decision (NO) in the determination processing of step S11, then the processing is ended. Next, after the abnormality determination processing of step S11, the ECU 20 determines whether or not the predetermined condition, for determining whether or not it is necessary to perform the second determination, is satisfied (step S12). With the present embodiment, a predetermined waiting period is set as the predetermined condition. Hence, after the abnormality determination processing of the PM filter 14 has been completed, each time that a predetermined time period (for example 5 minutes) has elapsed, the ECU 20 determines that the predetermined condition for executing the second determination is satisfied (YES decision). On the other hand if the predetermined time period has not yet elapsed, after the abnormality determination processing of the PM filter 14 has been completed, then the ECU 20 determines that the predetermined condition for executing the second determination is not satisfied (NO decision).

If the ECU 20 makes a positive decision in the determination processing of step S12 (YES), then processing advances to step S13. On the other hand, if a negative decision is made in step S12 (NO) then the ECU 20 terminates this processing. Next, the ECU 20 applies a voltage to the detection electrodes 36a and 36b temporarily (for example for approximately 1 second), and calculates the amount of adhering PM (step S13). The ECU 20 then determines whether or not the amount of adhering PM is equal to or greater than the excessive PM adherence determination threshold value Th2 (step S14). If the amount of adhering PM is equal to or greater than the excessive PM adherence determination threshold value Th2 then the ECU 20 makes a positive decision. On the other hand if the amount of adhering PM does not attain the excessive PM adherence determination threshold value Th2, then the ECU 20 makes a negative decision.

If a positive decision is reached in the determination processing of step S14 (YES), the ECU 20 increments a count of the number of times that the amount of adhering PM has been greater than or equal to the excessive PM adherence determination threshold value Th2, and processing advances to step S15. On the other hand if a negative decision is reached in the determination processing of step S14 (NO) then the ECU 20 terminates this processing. Next, the ECU 20 performs the second regeneration processing of the PM sensor 15 by heating of the heater 35 (step S15). In the second regeneration processing, the heater 35 is heated based on a predetermined heating temperature and heating duration, for burning off PM that adheres to the sensor element 31. With the present embodiment, the objective of the first regeneration processing is burning removal of PM adhering to the insulating substrate 32 of the sensor element 31. As opposed to this, the second regeneration processing has the objective of curtailing a condition of excessive adherence of PM, following the first regeneration processing. Hence, the heating temperature and the heating duration of the heater 35 can be the same in the second regeneration processing as in the first regeneration processing, however it would be equally possible for the heating duration in the second regeneration processing to be set shorter than in the first regeneration processing. Furthermore, the heating temperature could be set lower.

After the abnormality determination processing of the PM filter 14, the ECU 20 determines (step S16) whether or not the a predetermined number of times Th3 (for example, 2 times) has been reached for the cumulative number of times that it has been determined that the amount of adhering PM has become greater than or equal to the excessive PM adherence determination threshold value Th2. If the predetermined number of times Th3 has been reached, then the ECU 20 makes a positive decision. On the other hand if the predetermined number of times Th3 has not been reached, the ECU 20 makes a negative decision. If the ECU 20 makes a positive decision (YES) in step S16, the processing advances to step S17. On the other hand if the ECU 20 makes a negative decision (NO) in step S16, this processing is terminated. The ECU 20 executes the first regeneration processing of the PM sensor 15, and requests re-execution of the abnormality determination processing of the PM filter 14 (step S17).

Figure 5:
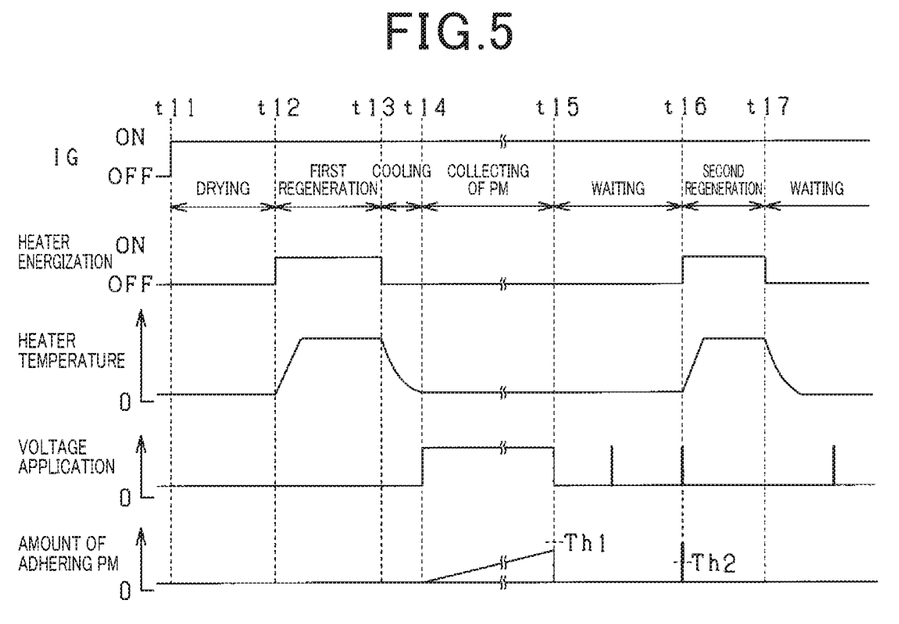
FIG. 5 is a timing diagram of states of the second regeneration processing.

The form of the second regeneration processing will next be described, referring to FIG. 5. In FIG. 5 it is envisaged that the IG switch is set in the on state, with the system being in the condition immediately after the engine 11 has been started.

At time point t11, the IG switch is changed over to the on state, and the engine 11 is started. As a result, the temperature in the interior of the exhaust pipe 13 rises, and condensed water in the exhaust pipe 13 evaporates. At time point t12, after a predetermined drying period has elapsed for evaporating the condensed water in the exhaust pipe 13, energizing of the heater 35 is started, and the first regeneration processing is executed. At that time, the temperature of the PM sensor 15 rises, and the PM adhering to the insulating substrate 32 of the sensor element 31 is burned off. At time point t13, the energizing of the heater 35 is halted, ending the first regeneration processing. As a result, the temperature of the PM sensor 15 falls. After a predetermined cooling period of the PM sensor 15 has elapsed following time point t14, a voltage is then applied continuously to the detection electrodes 36a and 36b until a predetermined time period (predetermined voltage application period) has elapsed. In the state in which the voltage is being applied to the detection electrodes 36a and 36b, PM which passes through the PM filter 14 adheres to the insulating substrate 32 (electrostatic collection). At that time, the amount of adhering PM increases. At time point t15, after a predetermined time period has elapsed, a first determination is performed, for determining whether or not the amount of adhering PM on the insulating substrate 32 is equal to or greater than the abnormality determination threshold value Th1. If as a result it is determined that the amount of adhering PM has not reached the abnormality determination threshold value Th1, then the abnormality determination processing of the PM filter 14 is completed.

Subsequent to time point t15, each time that a predetermined waiting period has elapsed, a voltage is applied momentarily to the detection electrodes 36a and 36b and the amount of adhering PM is obtained. With the present embodiment, the fact that the waiting period has elapsed signifies that the predetermined condition, for determining whether or not the second determination is required to be performed, is satisfied. Hence following time point t15, each time that the predetermined waiting period has elapsed, the second determination is performed for determining whether or not the amount of adhering PM is equal to or greater than the excessive PM adherence determination threshold value Th2. If it is determined as a result that the amount of adhering PM is equal to or greater than excessive PM adherence determination threshold value Th2, then heating of the heater 35 is started and the second regeneration processing is executed. At that time, the temperature of the PM sensor 15 rises, and the PM adhering to the insulating substrate 32 of the sensor element 31 is burned off. At time point t17, energizing of the heater 35 is halted and the second regeneration processing is completed. As a result, the temperature of the PM sensor 15 falls.

The following excellent effects are obtained with the sensor control apparatus of the present embodiment.

With the sensor control apparatus of the present embodiment, outside the voltage application period of the detection electrodes 36a and 36b (period of abnormality determination of PM filter 14), when a predetermined condition is satisfied, a determination is made as to whether or not the amount of adhering PM is equal to or greater than the excessive PM adherence determination threshold value Th2. If it is determined as a result that the amount of adhering PM is equal to or greater than the excessive PM adherence determination threshold value Th2, then the second regeneration processing of the PM sensor 15 is performed through heating by the heater 35. Hence with the sensor control apparatus of the present embodiment, even if PM adheres to the insulating substrate 32 at times outside the voltage application period, a condition of excessive adherence of the PM is not left unchanged. As a result, the sensor control apparatus can restrain an excessive amount of PM from adhering after the first regeneration processing of the PM sensor 15, and the amount of adhering PM can be appropriately determined.

After the abnormality determination processing of the PM filter 14, each time that a predetermined waiting period has elapsed, the sensor control apparatus of the present embodiment determines whether or not the amount of adhering PM is equal to or greater than the excessive PM adherence determination threshold value Th2 (the second determination is performed). After the period of voltage application to the detection electrodes 36a and 36b has elapsed, if it is determined that the amount of adhering PM is equal to or greater than the excessive PM adherence determination threshold value Th2, then the second regeneration processing is performed. As a result, following a predetermined time period of applying a voltage to the detection electrodes 36a and 36b, the sensor control apparatus of the present embodiment prevents a condition of excessive PM adherence, which can readily arise at that time, from being left unchanged.

With the sensor control apparatus of the present embodiment, following the abnormality determination processing of the PM filter 14, a voltage is applied temporarily to the detection electrodes 36a and 36b each time that a predetermined waiting period has elapsed, and the amount of adhering PM is determined. In that way, since the voltage is applied momentarily to the detection electrodes 36a and 36b, in the sensor control apparatus of the present embodiment, the amount of adhering PM can be determined while restraining the amount of power consumption that accompanies the application of the voltage. Furthermore with this sensor control apparatus, the electrostatic collection can be restricted, and increase in the amount of adhering PM can be restrained.

With the sensor control apparatus of the present embodiment, subsequent to performing abnormality determination processing of the PM filter 14, a decision is made as to whether or not the predetermined number of times Th3 has been reached for the cumulative number of times that the amount of adhering PM has been determined to be greater than or equal to the excessive PM adherence determination threshold value Th2. If it is determined as a result that the predetermined number of times Th3 has been reached, then the first determination processing of the PM sensor 15 and abnormality determination processing of the PM filter 14 are performed. Thus, in a condition in which the second regeneration processing of the PM sensor 15 is repetitively performed, it becomes determined that it is necessary to confirm whether the PM filter 14 is functioning normally, and abnormality determination of the filter is performed. Hence, the sensor control apparatus of the present embodiment enables abnormality of the PM filter 14 to be properly detected.

If the PM filter 14 is normal, it can be considered that a condition is being maintained in which the amount of adhering PM is relatively small, by comparison with the case in which it is abnormal. In that condition, from considerations of removal of PM that remains on the insulating substrate 32 of the sensor element 31, it is preferable that the excessive PM adherence determination threshold value Th2 is set smaller than the abnormality determination threshold value Th1. For that reason, with the sensor control apparatus of the present embodiment, the excessive PM adherence determination threshold value Th2 is set to a smaller value than the abnormality determination threshold value Th1. As a result, the sensor control apparatus provides increased effectiveness in restricting PM that remains after the first regeneration processing of the PM sensor 15.

Other Embodiments

The above embodiment could be changed in the following ways, for example.

The sensor control apparatus could be configured to execute the second determination, for determining the excessive PM adherence state, prior to the initial execution of the first regeneration processing, after the internal combustion engine is started. If as a result it is determined that the amount of adhering PM is equal to or greater than the excessive PM adherence determination threshold value Th2, then after the first regeneration processing is executed for the first time following the starting of the engine 11, the second regeneration processing could be executed, for eliminating the excessive PM adherence condition.

Figure 6:
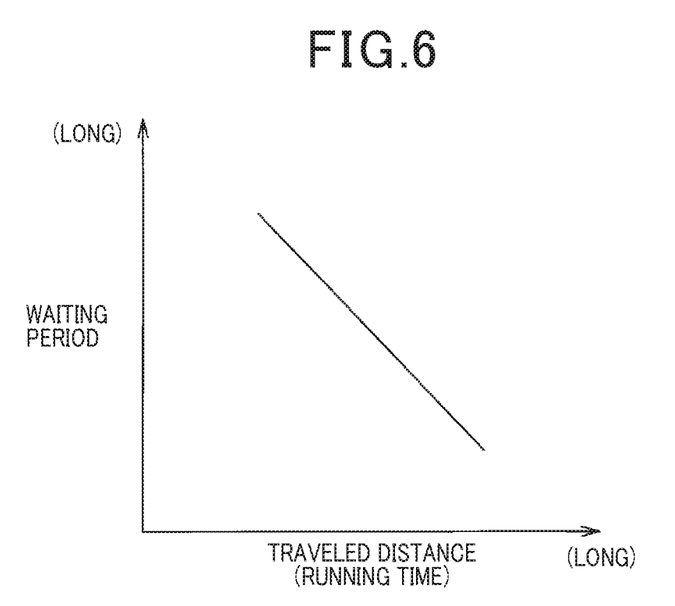
FIG. 6 is a diagram showing the relationship between a waiting period and a traveled distance or running time.

With regard to the state of residual PM on the insulating substrate 32 of the sensor element 31, it can be envisaged that after the second regeneration processing, the longer the traveled distance and the longer the running time of the vehicle, the greater will become the amount of adhering PM, and the condition of excessive PM adherence will readily arise. From consideration of this, it would be equally possible for the sensor control apparatus to acquire the running time or the traveled distance of the vehicle, as vehicle information, and to set a waiting period as a predetermined condition for determining whether or not it is necessary to perform the second determination. In that case, as shown in FIG. 6, the waiting period until the second determination processing of the PM sensor 15 is executed can be set such that the greater the traveled distance or the longer the running time of the vehicle, the shorter becomes the waiting period. In that way, in a condition in which a state of excessive PM adherence can readily arise due to the length of the traveled distance or of the running time of the vehicle, the frequency of making a second determination as to whether or not to perform the second regeneration processing of the PM sensor 15 will become high. As a result, the sensor control apparatus will be able to more effectively restrain an excessive PM adherence state from being left unchanged. It should be noted that it would be equally possible for the sensor control apparatus to have a configuration whereby the waiting period is based on the traveled distance and on the running time of the vehicle. In that way, the sensor control apparatus could be configured with a vehicle information acquisition section, for acquiring vehicle information that includes at least one of the traveled distance and the running time of the vehicle, and a predetermined condition alteration section for changing the predetermined condition for executing the second determination, based on the vehicle information.

Figure 7A:
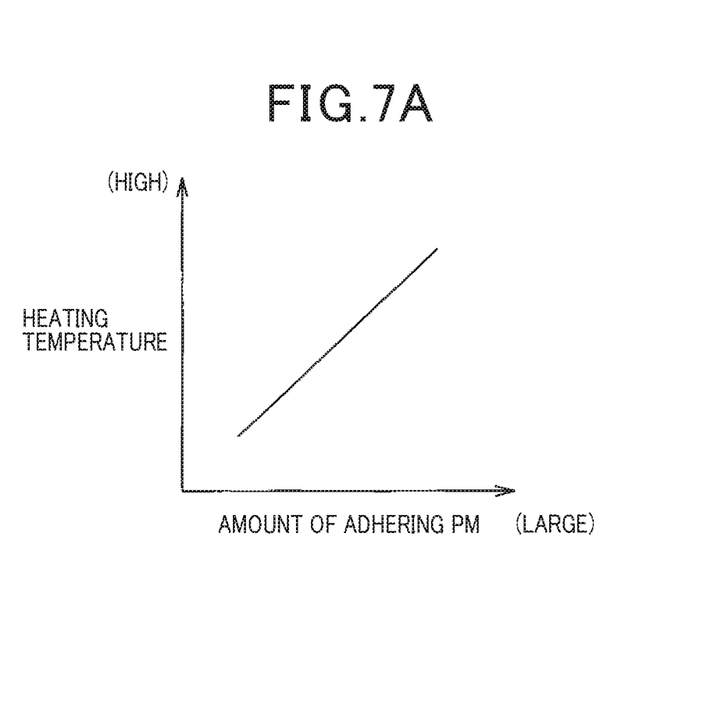
FIG. 7A is a diagram showing the relationship between an amount of adhering particulate matter and the temperature of heating by a heater.
Figure 7B:
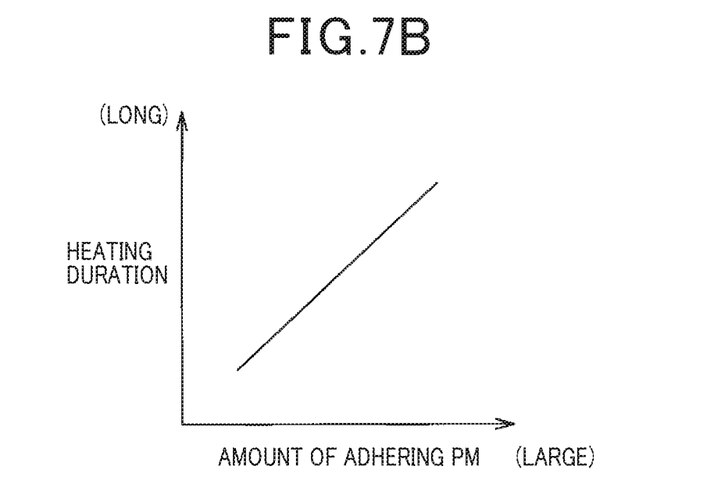
FIG. 7B is a diagram showing the relationship between the amount of adhering particulate matter and the duration of heating by the heater.

It would be also be possible for the sensor control apparatus to have a configuration such that, if the amount of adhering PM is determined to exceed the excessive PM adherence determination threshold value Th2, the heating temperature and the heating duration of the heater 35 that are used during the second regeneration processing of the PM sensor 15 are set based upon the amount of adhering PM. In that case as shown in FIGS. 7A and 7B, the greater the amount of adhering PM, the higher the heating temperature will be set, or the longer the heating duration will be set. In that way, the sensor control apparatus will suitable perform the second regeneration processing, taking into account the amount of adhering PM. The sensor control apparatus can thereby be configured to have a processing condition alteration section, which changes the processing conditions of the second regeneration processing based upon the amount of adhering PM, if the amount of adhering PM is determined to exceed a predetermined value.

The above embodiment has been assumed to have a configuration whereby a predetermined waiting period is predetermined as a predetermined condition for making a determination as to whether or not the second determination is to be executed, and whereby, after the abnormality determination processing has been executed, the second determination is performed each time the predetermined waiting period elapses. However the technique of the present disclosure is not limited to this. It would be equally possible for the sensor control apparatus to be configured such as to set a predetermined traveled distance as the predetermined condition for executing the second determination, and whereby, after the abnormality determination processing has been executed, the second determination is performed each time the predetermined traveled distance is attained.

The above embodiment has been assumed to have a configuration whereby the heating duration of the heater 35 used in the second regeneration processing is made shorter than the heating duration during the first regeneration processing. However the technique of the present disclosure is not limited to this. It would be equally possible for the sensor control apparatus to have a configuration whereby the heating duration of the heater 35 used in the second regeneration processing is made longer than during the first regeneration processing. Furthermore it would be equally possible for the sensor control apparatus to have a configuration whereby the heating temperature of the heater 35 in the second regeneration processing is made higher than that in the first regeneration processing.

When PM in the exhaust gas adheres to the insulating substrate 32 of the sensor element 31, the resistance of the PM detector 34 (the resistance value between the detection electrode 36a and the detection electrode 36b) will change. The above embodiment is configured to use that change in the resistance value of the PM detector 34 for detecting the amount of adhering PM. However the technique of the present disclosure is not limited to this. It would be equally possible for the sensor control apparatus to be configured to use a change in capacitance for detecting the amount of adhering PM.

REFERENCE SIGNS LIST

11 . . . Engine (internal combustion engine)
13 . . . Exhaust pipe (exhaust passage)
15 . . . PM sensor (sensor)
20 . . . ECU (sensor control apparatus)
32 . . . Insulating substrate (adherence portion)
35 . . . Heater (heating section)
36a and 36b . . . Detection electrodes (pair of counter electrodes)

The invention claimed is:

1. A sensor control apparatus configured for application to a sensor, the sensor comprising an adherence portion to which electrically conductive particulate matter contained in exhaust gas adheres, a pair of counter electrodes spaced apart from one another and disposed at the adherence portion, and a heater which heats the adherence portion, the sensor being disposed in an exhaust gas passage of an internal combustion engine and configured to output a detection signal in accordance with the amount of the adhering particulate matter, and the sensor control apparatus configured to detect the amount of the adhering particulate matter based on the detection signal, wherein the sensor control apparatus comprises:

a processor; and
a memory configured to stored computer readable instructions that, when executed by the processor, cause the sensor control apparatus to:
perform first regeneration processing of the sensor, through heating by the heater, after the internal combustion engine is started;
cause the particulate matter to adhere to the adherence portion by a condition in which a voltage is continuously applied to the pair of electrodes during a predetermined time period after the first regeneration processing has been performed, and perform first determination processing which determines the amount of adhering particulate matter on the adherence portion at a time point after the predetermined time period has elapsed;
perform second determination processing which determines whether or not the amount of adhering particulate matter on the adherence portion is equal to or greater than a predetermined value in response to a predetermined condition being satisfied outside of the predetermined time period;
perform second regeneration processing of the sensor through heating by the heater in response to determining that the amount of adhering particulate matter on the adherence portion is equal to or greater than the predetermined value;

perform the first regeneration processing, after a predetermined drying period has elapsed for evaporating the condensed water in an exhaust pipe after the internal combustion engine is started; and perform a determination of the amount of adhering particulate matter each time that a predetermined condition is satisfied, after the determination by the first determination processing.

2. The sensor control apparatus according to claim 1, wherein each time the predetermined condition is satisfied, the processor is configured to perform the second determination processing that applies a voltage to the counter electrodes, and determine the amount of adhering particulate matter.

3. The sensor control apparatus according to claim 1, wherein the processor is configured to perform the first regeneration processing and an adherence amount determination processing that determines the amount of adhering particulate matter, in response to a predetermined number of times being attained for the number of times the amount of adhering particulate matter has been determined to be equal to or greater than a predetermined value.

4. The sensor control apparatus according to claim 1 wherein the processor is further configured to:
information acquisition that acquires vehicle information including at least one of a traveled distance and a running time of a vehicle equipped with the sensor; and
perform first condition alteration processing that changes the predetermined condition, with the change being based upon the vehicle information.

5. The sensor control apparatus according to claim 1, wherein the processor is further configured to perform second condition alteration processing that alters a processing condition of the second regeneration processing, based upon the amount of adhering particulate matter, in response to determining by the second determination processing that the amount of adhering particulate matter is equal to or greater than a predetermined value.

6. The sensor control apparatus according to claim 1, wherein:
to determine whether the amount of adhering particulate matter that has reached the sensor is an appropriate amount, the processor is configured to perform the first determination processing that determines whether the amount of adhering particulate matter is equal to or greater than an abnormality determination threshold value; and
the predetermined value for the second determination processing is set as a value that is smaller than the abnormality determination threshold value.

7. The sensor control apparatus according to claim 1, wherein:
the sensor is disposed in an exhaust gas passage of the internal combustion engine, at the downstream side of a filter apparatus that collects the particulate matter; and
the processor is configured to perform the first determination processing that determines whether there is abnormality of the filter apparatus, based upon the amount of adhering particulate matter.

8. A sensor control apparatus configured for application to a sensor, the sensor comprising an adherence portion to which electrically conductive particulate matter contained in exhaust gas adheres, a pair of counter electrodes spaced apart from one another and disposed at the adherence portion, and a heater which heats the adherence portion, the sensor being disposed in an exhaust gas passage of an internal combustion engine and configured to output a detection signal in accordance with the amount of the adhering particulate matter, and the sensor control apparatus configured to detect the amount of the adhering particulate matter based on the detection signal, wherein the sensor control apparatus comprises:
a processor; and
a memory configured to stored computer readable instructions that, when executed by the processor, cause the sensor control apparatus to:
perform first regeneration processing of the sensor, through heating by the heater, after the internal combustion engine is started;
cause the particulate matter to adhere to the adherence portion by a condition in which a voltage is continuously applied to the pair of electrodes during a predetermined time period after the first regeneration processing has been performed, and perform first determination processing which determines the amount of adhering particulate matter on the adherence portion at a time point after the predetermined time period has elapsed;
perform second determination processing which determines whether or not the amount of adhering particulate matter on the adherence portion is equal to or greater than a predetermined value in response to a predetermined condition being satisfied outside of the predetermined time period;
perform second regeneration processing of the sensor through heating by the heater in response to determining that the amount of adhering particulate matter on the adherence portion is equal to or greater than the predetermined value; and
perform the first regeneration processing and an adherence amount determination processing that determines the amount of adhering particulate matter, in response to a predetermined number of times being attained for the number of times the amount of adhering particulate matter has been determined to be equal to or greater than a predetermined value.

9. A sensor control apparatus configured for application to a sensor, the sensor comprising an adherence portion to which electrically conductive particulate matter contained in exhaust gas adheres, a pair of counter electrodes spaced apart from one another and disposed at the adherence portion, and a heater which heats the adherence portion, the sensor being disposed in an exhaust gas passage of an internal combustion engine and configured to output a detection signal in accordance with the amount of the adhering particulate matter, and the sensor control apparatus configured to detect the amount of the adhering particulate matter based on the detection signal, wherein the sensor control apparatus comprises:
a processor; and
a memory configured to stored computer readable instructions that, when executed by the processor, cause the sensor control apparatus to:
perform first regeneration processing of the sensor, through heating by the heater, after the internal combustion engine is started;
cause the particulate matter to adhere to the adherence portion by a condition in which a voltage is continuously applied to the pair of electrodes during a predetermined time period after the first regeneration processing has been performed, and perform first determination processing which determines the amount of adhering particulate matter on the adherence portion at a time point after the predetermined time period has elapsed;

perform second determination processing which determines whether or not the amount of adhering particulate matter on the adherence portion is equal to or greater than a predetermined value in response to a predetermined condition being satisfied outside of the predetermined time period;

perform second regeneration processing of the sensor through heating by the heater in response to determining that the amount of adhering particulate matter on the adherence portion is equal to or greater than the predetermined value;

perform information acquisition processing that acquires vehicle information including at least one of a traveled distance and a running time of a vehicle equipped with the sensor; and perform first condition alteration processing that changes the predetermined condition, with the change being based upon the vehicle information.

* * * * *